INVENTOR
F. B. LLEWELLYN
BY H. A. Burgess
ATTORNEY

INVENTOR
F. B. LLEWELLYN
BY
H. A. Burgess
ATTORNEY

United States Patent Office 2,748,200

Patented May 29, 1956

2,748,200

TWO-WAY REPEATERS

Frederick B. Llewellyn, Summit, N. J., assignor to Bell Telephone Laboratories, Incorporated, New York, N. Y., a corporation of New York Application August 11, 1951, Serial No. 241,477

5 Claims. (Cl. 179—170)

This invention relates generally to two-way repeaters for use in electrical signal transmission systems and more particularly, although not exclusively, to repeaters for use in voice or carrier transmission systems.

The principal object of this invention is to provide relatively simple repeater networks which match the impedance of a transmission line to which they are connected, but whose gain can be varied without changing the impedance match.

The present invention comprises a bilateral repeater in the form of a four-terminal network in which the impedances of at least some of the impedance arms are negative. In general, both the short-circuit and the open-circuit impedances of the four-terminal network are negative. Such repeaters are relatively simple and have the advantage of having adjustments for impedance match and gain which are independent of each other. They may, for example, be used advantageously in electrical signal transmission systems in general and, in particular, in the repeatered transmission systems forming the basis for the present applicant's copending application Serial No. 217,941, filed March 28, 1951.

One embodiment of the invention takes the form of a lattice network in which the impedances of all four arms are negative. Another takes the form of a bridged-T network in which the impedances of the bridging and shunt arms are negative and the two series bridged arms each contain a winding of a transformer having a coupling coefficient of substantially unity.

A more complete understanding of the invention will appear from a study of the following detailed description of several specific embodiments. In the drawings.

Figure 1:
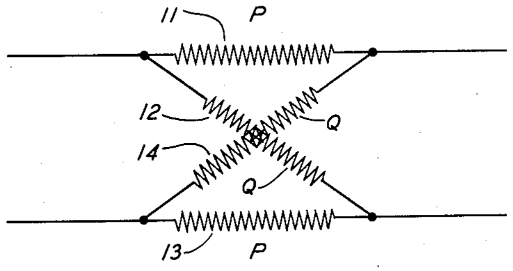
Fig. 1 shows an embodiment of the invention in the form of a lattice network.

The lattice structure illustrated in Fig. 1 is one of the most generalized of the various embodiments of the present invention. It is capable of being transformed into a number of other configurations by processes analogous to the m-derivation methods that have been used with considerable success in filter design.

The lattice structure itself has four impedance arms 11, 12, 13 and 14, two of which 11 and 13 are termed series arms and two of which 12 and 14 are termed cross arms. For convenience, the impedance of each of the series arms 11 and 13 is designated P, while that of each of the cross arms 12 and 14 is designated Q. Thus, there are the fundamental relations $$Z_I=\sqrt{PQ} \tag{1}$$

and $$\tanh\frac{\theta}{2}=\sqrt{\frac{P}{Q}} \tag{2}$$

where $Z_I$ is the image impedance and $\theta$ is the propagation factor of the repeater.

From 2, there can be written $$\sqrt{\Gamma_0}=e^{-\theta}=\frac{1-\tanh\frac{\theta}{2}}{1+\tanh\frac{\theta}{2}}=\frac{\sqrt{Q}-\sqrt{P}}{\sqrt{Q}+\sqrt{P}} \tag{3}$$

and, from 1

$$\sqrt{\Gamma_0}=\frac{Z_I-P}{Z_I+P} \tag{4}$$

where $\Gamma_0$ is the image gain of the repeater and is equal to the reciprocal of the image loss. When the repeater is matched at both ends, $\Gamma_0$ is the geometric mean between the gains in the two directions of transmission. In general, $\Gamma_0$ is defined by Equation 22 of the above-mentioned copending application of the present inventor. In the usual case, the gain will be the same in both directions of transmission and will be equal to $\Gamma_0$.

Solving 4 for P yields $$P=Z_I\frac{1-\sqrt{\Gamma_0}}{1+\sqrt{\Gamma_0}} \tag{5}$$

which, in general, will be recognized as a negative impedance of the so-called series or reversed voltage type (see, e. g., the article by G. Crisson entitled "Negative impedance and the twin 21-type repeater" appearing in the July 1931, issue of the Bell System Technical Journal), and substitution of 5 into 1 gives $$Q=Z_I\frac{1+\sqrt{\Gamma_0}}{1-\sqrt{\Gamma_0}} \tag{6}$$

which, in general, will be recognized as a negative impedance of the so-called shunt or reversed current type. Equations 5 and 6 are in a form suitable for finding the values of the impedances of the lattice structure of Fig. 1 which will yield any desired value of image impedance $Z_I$ and image gain $\Gamma_0$.

In accordance with the present invention, useful gain in both directions is secured from the repeater by making $\Gamma_0$ greater than unity. Examination of Equations 5 and 6 will reveal the impedances P and Q are both negative under such conditions.

Figure 2A:
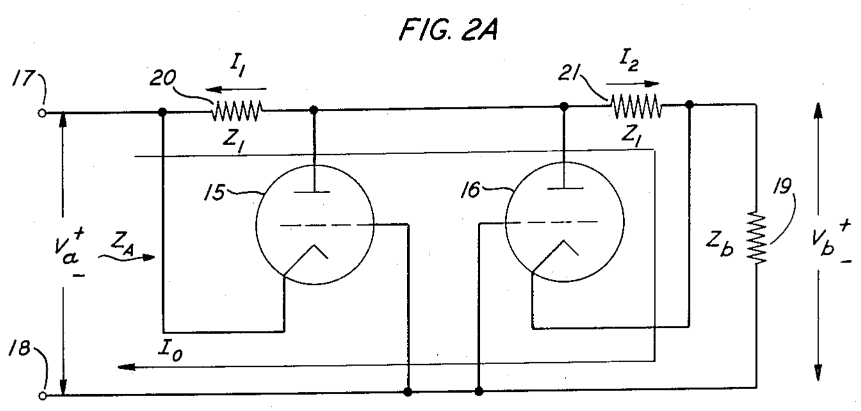
Fig. 2A is a schematic diagram of a series type of negative impedance converter suitable for use in embodiments of the present invention.
Figure 3A:
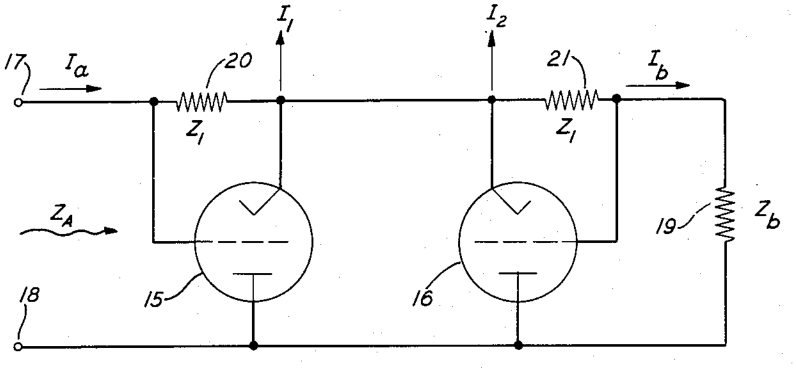
Fig. 3A is a schematic diagram of a shunt type of negative impedance converter suitable for use in embodiments of the present invention.

Figs. 2A and 3A exemplify physically realizable structures which may be used in embodiments of the invention to produce the required negative impedances. In Fig. 2A vacuum tubes 15 and 16 impress currents $I_1$ and $I_2$ in series with the connection between working terminals 17 and 18 and impedance element 19, while in Fig. 3A they impress then in shunt. It is for this reason that the circuits of Figs. 2A and 3A have been termed series type and shunt type converters, respectively. This is not, of course, to say that the circuits of Figs. 2A and 3A necessarily always produce either negative impedances of the series type or negative impedances of the shunt type. As a matter of fact, as illustrated, Figs. 2A and 3A both produce negative impedances of the series type but can, by interchanging their terminals and terminating impedances, be made to produce negative impedances of the shunt type. In either figure, both of the tubes may be reversed (that is, the cathode and anode may be interchanged) without affecting the property of producing the kind of impedance that is being sought. Of course, the locations of the biasing sources in the wiring diagrams would have to be changed accordingly and, as will appear from the analysis which follows, the positions of the terminals 17 and 18 and impedance 19 would also have to be interchanged. However, as stated above, the latter change by itself merely changes Equation 5 into Equation 6 and vice versa in the final result.

In Fig. 2A, impedance elements 20 and 21 represent the effective impedance between the anodes and cathodes of tubes 15 and 16, respectively, and the impedance of each is designated $Z_1$. $I_1$ is the current through impedance 20, $I_2$ is the current through impedance 21, $I_0$ is the total current flowing in and out of terminals 17 and 18, $V_a$ is the voltage between terminals 17 and 18, and $V_b$ is the voltage across impedance 19. $Z_b$ is the impedance of element 19, $Z_A$ is the input impedance of the circuit, and $g_1$ and $g_2$ are the transconductances of tubes 15 and 16, respectively. From the schematic diagram constituting Fig. 2A, the following equations can be written:

$$I_1=g_1V_a \quad (7)$$
$$I_2=g_2V_b \quad (8)$$
$$V_b=I_0Z_b \quad (9)$$
$$V_a=I_0(2Z_1+Z_b)-I_1Z_1+I_2Z_1 \quad (10)$$
$$V_a=I_0(2Z_1+Z_b)-Z_1g_1V_a+Z_1g_2V_b \quad (11)$$

$$V_a=I_0\frac{2Z_1+Z_b(1+g_2Z_1)}{(1+g_1Z_1)} \quad (12)$$

When $|2Z_1|<<|Z_b|$ and $g_2=-g_1$, $$V_a=I_0Z_b\frac{I-g_1Z_1}{1+g_1Z_1} \quad (13)$$

Therefore, $$Z_A=Z_b\frac{1-g_1Z_1}{1+g_1Z_1} \quad (14)$$

Because of the minus sign in the numerator, Equation 14, it will be recognized, is generally representative of a negative impedance of the series type. Reversing the relative positions of terminals 17 and 18 and terminating impedance 19 will have the effect of placing the minus sign in the denominator in the right hand side of Equation 14 and, in general, of changing the impedance to a negative impedance of the shunt type.

In Fig. 3A, impedance elements 20 and 21 represent the effective impedances between the cathodes and control grids of tubes 15 and 16, respectively, and the impedance of each is again designated $Z_1$. $I_1$ and $I_2$ are the cathode currents of tubes 15 and 16, respectively, $I_a$ is the current flowing in and out of terminals 17 and 18, and $I_b$ is the current flowing through impedance element 19. As before, $g_1$ and $g_2$ are the transconductances of vacuum tubes 15 and 16, $Z_b$ is the impedance of element 19 and $Z_A$ is the input impedance of the circuit. From the schematic diagram constituting Fig. 3A, the following equations can be written:

$$I_1=g_1Z_1I_a \quad (15)$$
$$I_2=g_2Z_1I_b \quad (16)$$
$$I_a=I_1+I_2+I_b \quad (17)$$
$$I_a=g_1Z_1I_a-g_2Z_1I_b+I_b \quad (18)$$
$$V_a=I_aZ_1+I_b(Z_1+Z_b) \quad (19)$$

$$V_a=I_a\frac{Z_1(2-g_1Z_1-g_2Z_1)+Z_b(1-g_1Z_1)}{(1-g_2Z_1)} \quad (20)$$

When $|2Z_1|<<|Z_b|$ and $g_2=-g_1$, $$V_a=I_aZ_b\frac{1-g_1Z_1}{1+g_1Z_1} \quad (21)$$

Therefore, $$Z_A=Z_b\frac{1-g_1Z_1}{1+g_1Z_1} \quad (22)$$

Equation 22, like Equation 14, has the minus sign in the numerator and may thus generally be taken as representing a negative impedance of the series or reversed voltage type. As with Fig. 2A, reversing the relative positions of terminals 17 and 18 and terminating impedance 19 will have the effect of placing the minus sign in the denominator of the right hand side of the equation and, in general, of changing the impedance to a negative impedance of the shunt type.

It is to be noted that, in both cases, some means for reversing the algebraic sign of the effective transconductance of one of the two tubes must be provided. In the voice-frequency range, the most convenient method is probably that of using transformers, and this is the one illustrated in the wiring diagrams constituting Figs. 2B and 3B. At higher frequencies, where transformers approximating the ideal are difficult to obtain, the phase reversal may be accomplished by the use of an extra vacuum tube. One convenient way of accomplishing this result is exemplified by the types of phase-reversing circuits that are widely used in the discriminator-limiter portions of frequency-modulation radio receivers.

Comparison of Equations 14 and 22 with Equation 5 shows that the series arm of the lattice in the embodiment of the invention shown in Fig. 1 may be produced by making $Z_b$, the impedance of element 19, equal to the desired image impedance $Z_I$ of the repeater and wiring the chosen negative impedance producing circuit to produce a negative impedance of the series type. The magnitude of the term $g_1Z_1$ should equal the square root of the desired repeater gain, expressed as a power ratio, and this relation should be maintained over the operating band of the repeater.

Once the correct network is obtained for the series arms of the lattice of Fig. 1, the appropriate one for the cross arms may be produced merely by interchanging the positions of terminals 17 and 18 and impedance element 19 in Figs. 2A and 3A. As explained above, the resulting circuit is, in general, a negative impedance of the shunt type. The complete lattice structure of Fig. 1 requires four elements and, in the strict lattice form, four circuits such as that of Fig. 2A or of Fig. 3A are required for the complete repeater. Each impedance arm in Fig. 1 represents a complete two-terminal negative impedance like those illustrated in Figs. 2A and 3A. It is to be understood, of course, that the terminals of each such negative impedance are connected to the points indicated diagrammatically by the ends of the respective lattice components.

Figure 2B:
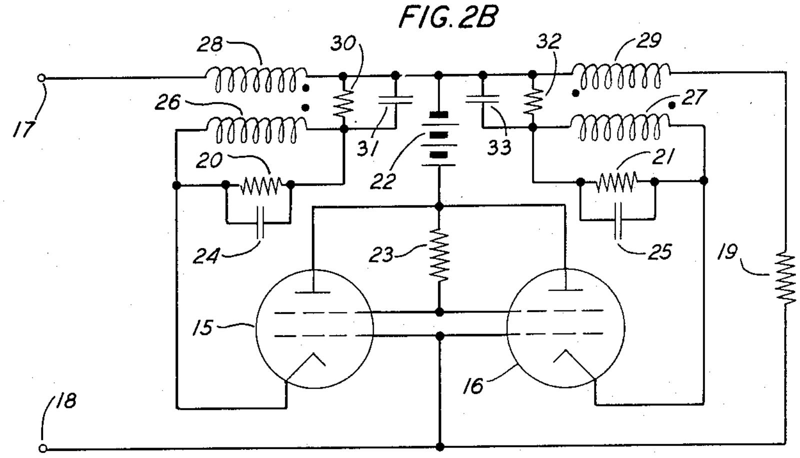
Fig. 2B is a wiring diagram of the negative impedance converter shown in Fig. 2A.

The wiring diagram in Fig. 2B illustrates in detail a negative impedance converter of the variety shown schematically in Fig. 2A. Vacuum tubes 15 and 16 are shown, by way of example, as screen grid tubes, and have their control grids connected to terminal 18. The cathodes of tubes 15 and 16 are connected to impedances 20 and 21, respectively, and the anodes are both connected to the positive side of a plate supply battery 22. The two screen grids are coupled together and a dropping resistor 23 is connected between them and the positive side of battery 22.

Impedances 20 and 21, which are, for most practical purposes, pure resistances, are by-passed by condensers 24 and 25, respectively. A winding 26 of a first transformer is connected across impedance 20, while a winding 27 of a second transformer is connected across impedance 21. Both transformers have a coupling coefficient of substantially unity. The other winding 28 of the first transformer is connected between terminal 17 and the negative side of battery 22, while the other winding 29 of the second transformer and impedance element 19 are connected in series between the negative side of battery 22 and terminal 18. A small biasing resistor 30 and a by-pass condenser 31 are connected in parallel between the side of impedance 20 away from the cathode of tube 15 and the negative side of battery 22, and a similar biasing resistor 32 and by-pass condenser 33 are connected in parallel between the side of impedance 21 away from the cathode of tube 16 and the negative side of battery 22. The respective transformer connections are such that windings 26 and 28 are in phase with each other, while windings 27 and 29 are reversed in phase.

Figure 3B:
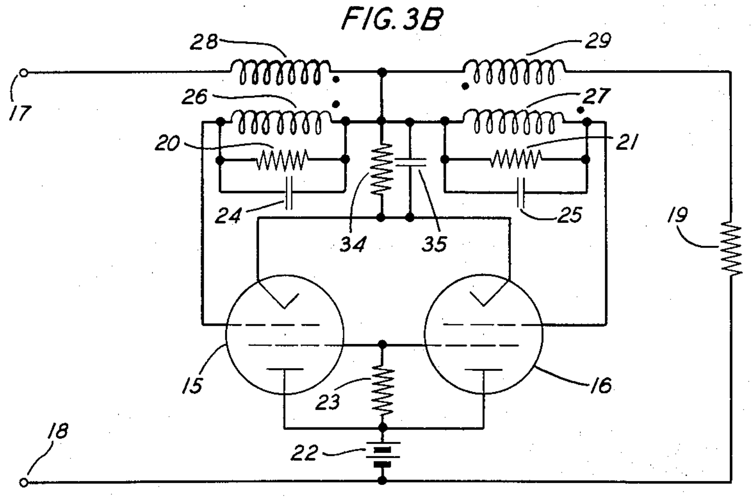
Fig. 3B is a wiring diagram of the negative impedance converter shown in Fig. 3A.

The wiring diagram in Fig. 3B illustrates in detail a negative impedance converter of the variety shown schematically in Fig. 3A. Most of the elements and the connections are the same as those in Fig. 2B. However, in Fig. 3B, the negative side of plate supply battery 22 is connected to terminal 18 and the positive side is connected to the anodes of tubes 15 and 16. Impedances 20 and 21 are connected to the control grids of tubes 15 and 16, respectively, and the sides of impedances 20 and 21 away from the control grids are connected directly to the junction between windings 28 and 29. A small biasing resistor 34 and a by-pass condenser 35 are connected in parallel between that junction and the cathodes of tubes 15 and 16.

In repeaters embodying the present invention, the gain is readily adjustable and is independent of the image impedance, as may be seen from a comparison of Equations 5 and 6 with Equations 14 and 22. The comparison shows that the image impedance depends only upon the impedance $Z_b$, while the repeater gain depends only upon the product $g_1Z_1$.

The invention may take other forms than the embodiment shown in Fig. 1. Standard network theory teaches that a lattice structure can be converted to other equivalent four-terminal networks by selecting impedances so that such networks have the same open and short-circuit impedances as the lattice structure. In the embodiment of the invention shown in Fig. 1, $$Z \text{ open}=\frac{P+Q}{2} \quad (23)$$

while $$Z \text{ short}=\frac{2PQ}{P+Q} \quad (24)$$

Substituting 5 and 6 in 23 and 24 yields the generalized expressions $$Z \text{ open}=Z_I\frac{1+\Gamma_0}{1-\Gamma_0} \quad (25)$$

and $$Z \text{ short}=Z_I\frac{1-\Gamma_0}{1+\Gamma_0} \quad (26)$$

In accordance with the present invention, repeater networks are made to satisfy Equations 25 and 26, with the image gain $\Gamma_0$ greater than unity.

Figure 4:
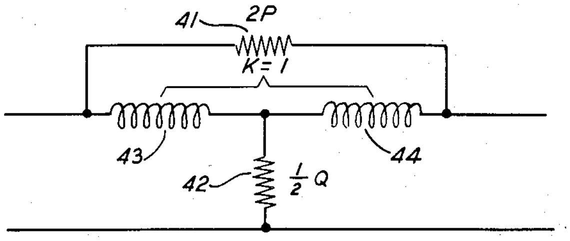
Fig. 4 shows an embodiment of the invention in the form of a bridged-T network.

A second embodiment of the invention is shown in Fig. 4. It is in the form of a bridged-T network and comprises a total of four impedance arms 41, 42, 43 and 44. One arm 41 is termed the series or bridging arm, another 42 is termed the shunt arm. Arms 43 and 44 contain respective primary and secondary windings of a transformer having a transformer ratio and a coupling coefficient of substantially unity. The impedances of series arm 41 and shunt arm 42 are 2P and ½Q, respectively. In terms of image impedance $Z_I$ and image gain $\Gamma_0$, the impedance of series arm 41 is $$2P=2Z_I\frac{1-\sqrt{\Gamma_0}}{1+\sqrt{\Gamma_0}} \quad (27)$$

while that of shunt arm 42 is $$\frac{1}{2}Q=\frac{Z_I}{2}\,\frac{1+\sqrt{\Gamma_0}}{1-\sqrt{\Gamma_0}} \quad (28)$$

Since the minus sign is in the numerator, Equation 27 represents, in general, a negative impedance of the series type. On the other hand, since the minus sign is in the denominator, Equation 28 is generally representative of a negative impedance of the shunt type. The circuit is the full equivalent of the lattice structure shown in Fig. 1 and circuits such as those shown in Figs. 2A and 3A may be used to secure the necessary negative impedances.

The embodiment of the invention illustrated in Fig. 4 has the advantage over that of Fig. 1 of requiring only two negative impedances, rather than four. It tends, therefore, to be somewhat simpler and easier to construct while still retaining the advantage of having its gain independent of its image impedance. For voice frequencies, transformer coupling coefficients of unity can be closely approximated, so the bridged-T structure may readily be used in that range. The circuit shown in Fig. 4 has the additional advantage of, when a relatively large by-pass condenser can be inserted in series with shunt arm 42, being adaptable for use in those applications where it is necessary that the insertion of the repeater into the line not interfere with signaling currents.

It is to be understood that the above-described arrangements are illustrative of the application of the principles of the invention. Numerous other arrangements may be devised by those skilled in the art without departing from the spirit and scope of the invention.

What is claimed is:

1. A two-way repeater in the form of a lattice network in which the impedance of each of the series arms is equal to substantially $$Z_I\frac{1-\sqrt{\Gamma_0}}{1+\sqrt{\Gamma_0}}$$

and the impedance of each of the cross arms is equal to substantially $$Z_I\frac{1+\sqrt{\Gamma_0}}{1-\sqrt{\Gamma_0}}$$

where $Z_I$ is the image impedance of the repeater and $\Gamma_0$ is the image gain of the repeater and is greater than unity.

2. A two-way repeater in the form of a bridged-T network in which the impedance of the series bridging arm is substantially $$2Z_I\frac{1-\sqrt{\Gamma_0}}{1+\sqrt{\Gamma_0}}$$

one of the two arms connected between the ends of the series bridging arm and one end of the shunt arm contains the primary winding and the other contains the secondary winding of a transformer having a transformer ratio and a coupling coefficient of substantially unity, and the impedance of the shunt arm is substantially $$\frac{Z_1}{2}\,\frac{1+\sqrt{\Gamma_0}}{1-\sqrt{\Gamma_0}}$$

where $Z_I$ is the image impedance of the repeater and $\Gamma_0$ is the image gain of the repeater and is greater than unity.

3. A bilateral repeater in which the gain can be varied independently of the image impedance thereof which comprises a lattice network having a pair of series arms and a pair of cross arms, each of said series arms having an impedance substantially equal to $$Z_I\frac{1-\sqrt{\Gamma_0}}{1+\sqrt{\Gamma_0}}$$

and comprising a negative impedance converter terminated in an impedance substantially equal to $Z_I$, and each of said cross arms having an impedance substantially equal to $$Z_I\frac{1+\sqrt{\Gamma_0}}{1-\sqrt{\Gamma_0}}$$

and comprising a negative impedance converter terminated in an impedance substantially equal to $Z_I$, where $Z_I$ is the image impedance of the repeater and $\Gamma_0$ is the image gain of the repeater and is greater than unity.

4. A bilateral repeater in which the gain can be varied independently of the image impedance thereof which comprises a four-terminal network having at least one impedance arm connected substantially in series in the through signal transmission path thereof and at least one impedance arm connected substantially in shunt across the through signal transmission path thereof, said series arm having an impedance substantially directly proportional to $$Z_I\frac{1+\sqrt{\Gamma_0}}{1-\sqrt{\Gamma_0}}$$

and comprising a negative impedance converter terminated in an impedance substantially directly proportional to $Z_I$ and said shunt arm having an impedance substantially proportional to $$Z_I\frac{1+\sqrt{\Gamma_0}}{1-\sqrt{\Gamma_0}}$$

and comprising a negative impedance converter terminated in an impedance substantially directly proportional to $Z_I$, where $Z_I$ is the image impedance of the repeater and $\Gamma_0$ is the image gain of the repeater and is greater than unity.

5. A bilateral repeater in which the gain can be varied independently of the image impedance thereof which comprises a bridged-T network having a series bridging arm, a shunt arm, and two arms connected between the respective ends of said series bridging arm and one end of said shunt arm, said two last-mentioned arms containing the primary and secondary windings, respectively, of a transformer having a transformer ratio and a coupling coefficient of substantially unity, said series bridging arm having an impedance substantially equal to $$2Z_I\frac{1-\sqrt{\Gamma_0}}{1+\sqrt{\Gamma_0}}$$

and comprising a negative impedance converter terminated in an impedance substantially equal to $2Z_I$, and said shunt arm having an impedance substantially equal to $$\frac{Z_I}{2}\,\frac{1+\sqrt{\Gamma_0}}{1-\sqrt{\Gamma_0}}$$

and comprising a negative impedance converter terminated in an impedance substantially equal to $$\frac{Z_I}{2}$$

where $Z_I$ is the image impedance of the receiver and $\Gamma_0$ is the image gain of the repeater and is greater than unity.

References Cited in the file of this patent

UNITED STATES PATENTS

| | | |
|---|---|---|
| 1,756,816 | Dolmage | Apr. 29, 1930 |
| 1,776,310 | Crisson | Sept. 23, 1930 |
| 1,779,380 | Dudley | Oct. 21, 1930 |
| 1,836,810 | Mason | Dec. 15, 1931 |
| 1,900,045 | Crisson | Mar. 7, 1933 |